United States Patent
Shen et al.

(10) Patent No.: US 10,171,116 B2
(45) Date of Patent: Jan. 1, 2019

(54) DATA TRANSMISSION METHOD AND DEVICE

(71) Applicant: SOOCHOW UNIVERSITY, Suzhou (CN)

(72) Inventors: Gangxiang Shen, Suzhou (CN); Longfei Li, Suzhou (CN); Haomin Jiang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 15/557,488

(22) PCT Filed: Nov. 10, 2016

(86) PCT No.: PCT/CN2016/105322
§ 371 (c)(1),
(2) Date: Sep. 12, 2017

(87) PCT Pub. No.: WO2017/080488
PCT Pub. Date: May 18, 2017

(65) Prior Publication Data
US 2018/0062676 A1    Mar. 1, 2018

(30) Foreign Application Priority Data

Nov. 12, 2015 (CN) .......................... 2015 1 0770033

(51) Int. Cl.
*H04B 1/04* (2006.01)
*H04L 9/08* (2006.01)
(Continued)

(52) U.S. Cl.
CPC ............. *H04B 1/0483* (2013.01); *H04L 9/08* (2013.01); *H04L 9/0827* (2013.01);
(Continued)

(58) Field of Classification Search
CPC ........ H04W 24/02; H04L 1/1635; H04L 9/08; H04L 2001/0096; H04B 1/0483
See application file for complete search history.

(56) References Cited

U.S. PATENT DOCUMENTS

2005/0002421 A1   1/2005  Ito et al.
2005/0129020 A1*  6/2005  Doyle ..................... H04L 69/22
                                                    370/392
(Continued)

FOREIGN PATENT DOCUMENTS

CN       1551509 A    12/2004
CN       1984020 A     6/2007
(Continued)

*Primary Examiner* — Sung Ahn
(74) *Attorney, Agent, or Firm* — SZDC Law P.C.

(57) ABSTRACT

A data transmission method and a data transmission device are provided. The method includes: establishing, by a transmitting end, N different first paths between the transmitting end and a receiving end in an established network; splitting, by the transmitting end, a fixed-length data frame into N first fragments; transmitting, by the transmitting end, the first fragments to the receiving end through the corresponding first paths respectively; splitting, by the transmitting end, the data frame into N-M second fragments in a case that a failure occurs in M of the first paths during transmission of the data frame; establishing, by the transmitting end, N-M different second paths between the transmitting end and the receiving end; transmitting, by the transmitting end, the second fragments to the receiving end through the corresponding second paths respectively.

7 Claims, 7 Drawing Sheets

(51) Int. Cl.
*H04L 9/14* (2006.01)
*H04L 1/00* (2006.01)

(52) U.S. Cl.
CPC .............. *H04L 9/0869* (2013.01); *H04L 9/14* (2013.01); *H04L 2001/0096* (2013.01)

(56) References Cited

U.S. PATENT DOCUMENTS

| | | | |
|---|---|---|---|
| 2006/0245384 A1* | 11/2006 | Talukdar | H04L 1/0041 370/310 |
| 2007/0281664 A1* | 12/2007 | Kaneko | G06F 21/88 455/410 |
| 2008/0051123 A1 | 2/2008 | Shinozaki | |
| 2013/0173904 A1 | 7/2013 | Obligacion | |
| 2016/0166818 A1 | 6/2016 | Orsini et al. | |
| 2016/0226633 A1 | 8/2016 | Hu et al. | |

FOREIGN PATENT DOCUMENTS

| | | |
|---|---|---|
| CN | 101138262 A | 3/2008 |
| CN | 101394273 A | 3/2009 |
| CN | 102447698 A | 5/2012 |
| CN | 102882960 A | 1/2013 |
| CN | 102938730 A | 2/2013 |
| CN | 103229450 A | 7/2013 |
| CN | 104579605 A | 4/2015 |
| CN | 105450390 A | 3/2016 |
| WO | 2010148866 A1 | 12/2010 |

\* cited by examiner

DATA TRANSMISSION METHOD AND DEVICE

The present application is the national phase of International Patent Application No. PCT/CN2016/105322, titled "DATA TRANSMISSION METHOD AND DEVICE," filed on Nov. 10, 2016, which claims the priority to Chinese Patent Application No. 201510770033.9, titled "DATA TRANSMISSION METHOD AND DEVICE," filed on Nov. 12, 2015 with the State Intellectual Property Office of the People's Republic of China, both of which are incorporated herein by reference in their entireties.

TECHNICAL FIELD

The present disclosure relates to the field of network, and in particular to a data transmission method and a data transmission device.

BACKGROUND

With the rapid arrival of the information age, military network communication has gradually become indispensable for various military activities. Secure communication and network self-healing capability are two keys to build a powerful military communication network.

Presently, an application layer-based secure communication technology is adopted in the military communication network, because the application layer-based secure communication technology is relatively mature and difficult to crack without knowing an encryption and decryption key and an adopted algorithm.

The network self-healing capability refers to that, point-to-point communication can be rapidly self-healed without being affected in a case that one or more network links break due to an attack or a failure occurring to the network. Communications in military applications have a higher demand on the network self-healing capability, as there may be a large number and a large range of network failures, such as three failures happening at the same time or a regional failure.

However, in existing researches, the secure communication and the network self-healing capability are often researched separately, resulting in that the military communication network cannot have both the secure communication capability and the network self-healing capability, which is disadvantageous for constructing a powerful military communication network.

SUMMARY

In view of the above, a data transmission method and a data transmission device are provided according to embodiments of the present disclosure, by which the military communication network can have both a secure communication capability and a network self-healing capability, which is advantageous for constructing a powerful military communication network. The technical solution is described below.

A data transmission method is provided according to the present disclosure. The method includes:

establishing, by a transmitting end, N different first paths between the transmitting end and a receiving end in an established network, where N is an integer greater than 1;

splitting, by the transmitting end, a fixed-length data frame into N first fragments, where each of the first fragments corresponds to a different one of the first paths, and a length of an i-th first fragment is $L*P(i)/\Sigma_{i=1}^{N}P(i)$, where L is the length of the data frame, $P(i)$ is a random number generated from a pre-set key by a pre-set algorithm, $P(i)$ is greater than 0 and less than 1, and $\Sigma_{i=1}^{N}P(i)=1$;

transmitting, by the transmitting end, the first fragments to the receiving end through the corresponding first paths respectively so that the receiving end combines the first fragments based on the pre-set algorithm;

splitting, by the transmitting end, the data frame into N-M second fragments in a case that a failure occurs in M of the first paths during transmission of the data frame, where M is an integer not less than 1 and not greater than N−1, a length of an i-th second segment is $L*P'(i)/\Sigma_{i=1}^{N-M}P'(i)$, $P'(i)$ is a random number generated from the pre-set key by the pre-set algorithm, $P'(i)$ is greater than 0 and less than 1, and $\Sigma_{i=1}^{N-M}P'(i)=1$;

establishing, by the transmitting end, N-M different second paths between the transmitting end and the receiving end, where each of the second fragments corresponds to a different one of the second paths; and transmitting, by the transmitting end, the second fragments to the receiving end through the corresponding second paths respectively so that the receiving end combines the second fragments based on the pre-set algorithm.

Preferably, $P(i)$ is the random number generated from the pre-set key by different pre-set algorithms at different times; and/or $P'(i)$ is the random number generated from the pre-set key by different pre-set algorithms at different times.

Preferably, after transmitting, by the transmitting end, the first fragments to the receiving end through the corresponding first paths respectively, the method further includes:

splitting, by the transmitting end, the data frame into N-J third fragments in a case that J of the first paths have a risk of failure during transmission of the data frame, where J is an integer not less than 1 and not greater than N−1, a length of an i-th third segment is $L*P''(i)/\Sigma_{i=1}^{N-J}P''(i)$, $P''(i)$ is a random number generated from the pre-set key by the pre-set algorithm, $P''(i)$ is greater than 0 and less than 1, and $\Sigma_{i=1}^{N-J}P''(i)=1$; and transmitting, by the transmitting end, the third fragments to the receiving end through the corresponding N-J of the first paths having no risk of failure.

Preferably, after transmitting, by the transmitting end, the second fragments to the receiving end through the corresponding second paths respectively, the method further includes:

splitting, by the transmitting end, the data frame into N-M-H fourth fragments in a case that H of the second paths have a risk of failure during transmission of the data frame, where H is an integer not less than 1 and not greater than N-M, a length of an i-th fourth segment is $L*P'''_1(i)/\Sigma_{i=1}^{N-M-H}P'''_1(i)$, $P'''_1(i)$ is a random number generated from the pre-set key by the pre-set algorithm, $P'''_1(i)$ is greater than 0 and less than 1, and $\Sigma_{i=1}^{N-M-H}P'''_1(i)=1$; and transmitting, by the transmitting end, the fourth fragments to the receiving end respectively through the N-M-H of the second paths having no risk of failure.

A data transmission device is provided according to the present disclosure. The device includes:

a first establishing unit configured to establish N different first paths between a transmitting end and a receiving end in an established network, where N is an integer greater than 1;

a first splitting unit configured to split a fixed-length data frame into N first fragments, where each of the first fragments corresponds to a different one of the first paths, and a length of an i-th first fragment is $L*P(i)/\Sigma_{i=1}^{N}P(i)$, where L is the length of the data frame, $P(i)$ is a random number generated from a pre-set key by a pre-set algorithm, P(i) is greater than 0 and less than 1, and $\Sigma_{i=1}^{N} P(i)=1$;

a first transmitting unit configured to transmit the first fragments to the receiving end through the corresponding first paths respectively so that the receiving end combines the first fragments based on the pre-set algorithm;

a second splitting unit configured to split the data frame into N-M second fragments in a case that a failure occurs in M of the first paths during transmission of the data frame, where M is an integer not less than 1 and not greater than N-1, a length of an i-th second segment is $L*P'(i)/\Sigma_{i=1}^{N-M} P'(i)$, P'(i) is a random number generated from the pre-set key by the pre-set algorithm, P'(i) is greater than 0 and less than 1, and $\Sigma_{i=1}^{N-M} P'(i)=1$;

a second establishing unit configured to establish N-M different second paths between the transmitting end and the receiving end, where each of the second fragments corresponds to a different one of the second paths; and a second transmitting unit configured to transmit the second fragments to the receiving end through the corresponding second paths respectively so that the receiving end combines the second fragments based on the pre-set algorithm.

Preferably, the device further includes a third splitting unit and a third transmitting unit.

The third splitting unit is configured to, after the first transmitting unit transmits the first fragments to the receiving end through the corresponding first paths respectively, split the data frame into N-J third fragments in a case that J of the first paths have a risk of failure during transmission of the data frame, where J is an integer not less than 1 and not greater than N-1, a length of an i-th third segment is $L*P''(i)/\Sigma_{i=1}^{N-J} P''(i)$, P''(i) is a random number generated from the pre-set key by the pre-set algorithm, P''(i) is greater than 0 and less than 1, and $\Sigma_{i=1}^{N-J} P''(i)=1$.

The third transmitting unit is configured to transmit the third fragments to the receiving end through the corresponding N-J of the first paths having no risk of failure.

Preferably, the device further includes a fourth splitting unit and a fourth transmitting unit.

The fourth splitting unit is configured to, after the second transmitting unit transmits the second fragments to the receiving end through the corresponding second paths respectively, split the data frame into N-M-H fourth fragments in a case that H of the second paths have a risk of failure during transmission of the data frame, where H is an integer not less than 1 and not greater than N-M, a length of an i-th fourth segment is $L*P'''_1(i)/\Sigma_{i=1}^{N-M-H} P'''_1(i)$, $P'''_1(i)$ is a random number generated from the pre-set key by the pre-set algorithm, $P'''_1(i)$ is greater than 0 and less than 1, and $\Sigma_{i=1}^{N-M-H} P'''_1(i)=1$.

The fourth transmitting unit is configured to transmit the fourth fragments to the receiving end respectively through the N-M-H of the second paths having no risk of failure.

Compared with the prior art, the present disclosure has the following beneficial effects.

In the present disclosure, the transmitting end splits the fixed-length data frame into N first fragments for transmission, where the length of an i-th first fragment is $L*P(i)/\Sigma_{i=1}^{N} P(i)$, and P(i) is a random number generated from the pre-set key by the pre-set algorithm. The receiving end combines the second fragments based on the same pre-set algorithm as the algorithm used by the transmitting end. In such a way, secure transmission of data is achieved.

In a case that a failure occurs in M of the first paths during transmission of the data frame, the transmitting end re-splits the data frame into N-M second fragments and transmits each of the second fragments to the receiving end through the established N-M second paths, where the length of an i-th second segment is $L*P'(i)/\Sigma_{i=1}^{N-M} P'(i)$, P'(i) is a random number generated from the pre-set key by the pre-set algorithm. In such a way, the secure transmission of data is recovered, and thus the self-healing of a network is achieved.

Therefore, in the present disclosure, the military communication network can have both the secure communication capability and the network self-healing capability, which is advantageous for constructing a powerful military communication network.

BRIEF DESCRIPTION OF THE DRAWINGS

To illustrate technical solutions according to embodiments of the present disclosure more clearly, drawings to be used in the descriptions of the embodiments are described briefly hereinafter. Apparently, the drawings described hereinafter are only for some embodiments of the present disclosure, and other drawings may be obtained by those skilled in the art based on those drawings without creative efforts.

DETAILED DESCRIPTION OF THE EMBODIMENTS

Technical solutions of embodiments of the present disclosure are illustrated clearly and completely in conjunction with the following drawings of the embodiments of the disclosure. Apparently, the described embodiments are merely a few rather than all of the embodiments of the present disclosure. All other embodiments obtained by persons of ordinary skill in the art based on the embodiments of the present disclosure without creative efforts shall fall within the protection scope of the present disclosure.

First Embodiment

Figure 1:
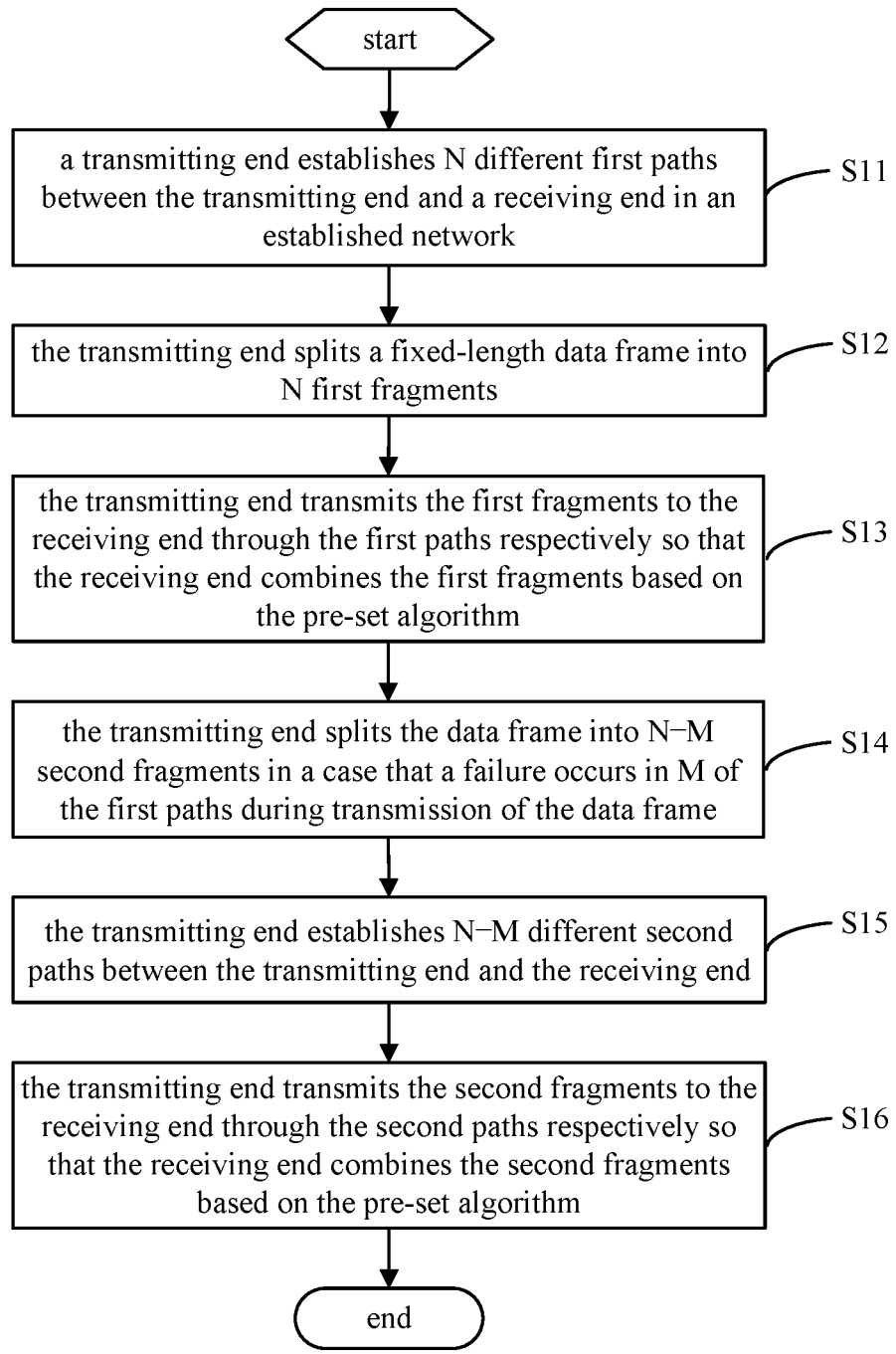
FIG. 1 is a flow chart of a data transmission method according to an embodiment of the present disclosure.

Reference is made to FIG. 1, which is a flow chart of a data transmission method according to an embodiment of the present disclosure. The method may include steps S11 to S16.

Figure 5:
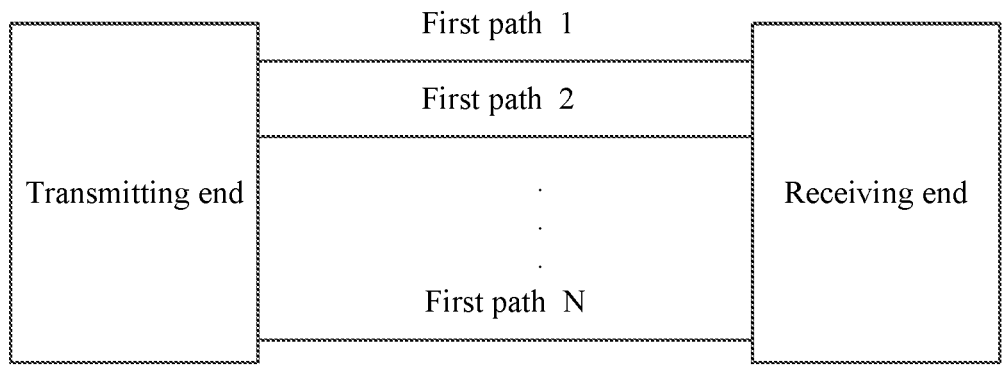
FIG. 5 is a schematic diagram showing N first paths between a transmitting end and a receiving end.

In step S11, a transmitting end establishes N different first paths between the transmitting end and a receiving end in an established network, as shown in FIG. 5.

N is an integer greater than 1.

In step S12, the transmitting end splits a fixed-length data frame into N first fragments. Each of the first fragments corresponds to a different one of the first paths.

In the embodiment, a length of an i-th first fragment is $L*P(i)/\Sigma_{i=1}^{N}P(i)$, where L is the length of the data frame, P(i) is a random number generated from a pre-set key by a pre-set algorithm, P(i) is greater than 0 and less than 1, and $\Sigma_{i=1}^{N}P(i)=1$.

In the embodiment, the pre-set key and the pre-set algorithm are not limited, as long as they are applicable to encryption in the application layer.

In step S13, the transmitting end transmits the first fragments to the receiving end through the corresponding first paths respectively so that the receiving end combines the first fragments based on the pre-set algorithm.

In steps S11 to S13, N different first paths are established, the data frame are split into N first fragments, and the first fragments are transmitted to the receiving end through the corresponding first paths, which achieves multi-path secure transmission of the data frame.

In step S14, the transmitting end splits the data frame into N-M second fragments in a case that a failure occurs in M of the first paths during transmission of the data frame.

In the embodiment, M is an integer not less than 1 and not greater than N-1, a length of an i-th second segment is $L*P'(i)/\Sigma_{i=1}^{N-M}P'(i)$, P'(i) is a random number generated from the pre-set key by the pre-set algorithm, P'(i) is greater than 0 and less than 1, and $\Sigma_{i=1}^{N-M}P'(i)=1$.

Figure 6:
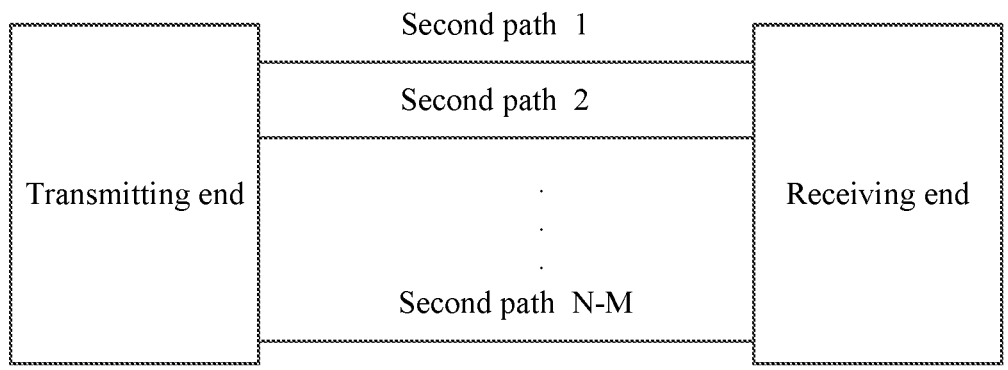
FIG. 6 is a schematic diagram showing N-M second paths between a transmitting end and a receiving end.

In step S15, the transmitting end establishes N-M different second paths between the transmitting end and the receiving end, as shown in FIG. 6.

Each of the second fragments corresponds to a different one of the second paths.

In step S16, the transmitting end transmits the second fragments to the receiving end through the corresponding second paths respectively so that the receiving end combines the second fragments based on the pre-set algorithm.

In the embodiment, if M is not greater than N-2, multi-path secure transmission of the data frame can be achieved.

In the embodiment, since a maximum value of M is N-1, the transmitting end can continue to transmit data to the receiving end through one remaining path if a failure occurs in N-1 first paths, which makes the network have a high network self-healing capability. Even if the network is damaged in a large area, normal secure communication can be ensured, as long as the two points are connected. However, when a value of M is N-1, the data frame is transmitted through the only path, losing the benefit of multi-path secure communication. The whole of transmitted data in this case will be more easily stolen compared with the case of multi-path secure communication.

In the embodiment, if the preset key is invalid due to an attack during transmission of the data frame, although a random number cannot be generated from the preset key by the preset algorithm, the transmitting end and the receiving end can still continue to operate based on the original preset algorithm since the transmitting end and the receiving end both use the same preset algorithm, thereby having a high robustness and security.

In the embodiment, the transmitting end splits the fixed-length data frame into N first fragments, where the length of an i-th first fragment is $L*P(i)/\Sigma_{i=1}^{N}P(i)$, and P(i) is a random number generated from the pre-set key by the pre-set algorithm. The receiving end combines the second fragments based on the same pre-set algorithm as the algorithm used by the transmitting end. In such a way, secure transmission of data is achieved.

In a case that a failure occurs in M of the first paths during transmission of the data frame, the transmitting end re-splits the data frame into N-M second fragments and transmits the second fragments to the receiving end through the established N-M second paths, where the length of an i-th second segment is $L*P'(i)/\Sigma_{i=1}^{N-M}P'(i)$, P'(i) is a random number generated from the pre-set key by the pre-set algorithm. In such a way, the secure transmission of data is recovered, and thus the self-healing of the network is achieved.

Therefore, in the present disclosure, the military communication network can have both the secure communication capability and the network self-healing capability, which is advantageous for constructing a powerful military communication network.

Further, the data frame is split into multiple segments, and the multiple segments are transmitted through multiple paths. Therefore, an interceptor have to obtain all data at different geographical locations at the same time to intercept the information, which makes it difficult to intercept and crack and enhances security of the military communication network.

In the embodiment, it should be noted that P(i) in step S12 is the random number generated from the pre-set key by different pre-set algorithms at different times.

Additionally or alternatively, P'(i) in step S12 is the random number generated from the pre-set key by different pre-set algorithms at different times.

The P(i) being the random number generated from the pre-set key by different pre-set algorithms at different times refers to that the random numbers may be generated from the pre-set key by using different pre-set algorithms at different times, where the different times depend on the pre-set key.

The P'(i) being the random number generated from the pre-set key by different pre-set algorithms at different times refers to that the random numbers may be generated from the pre-set key by using different pre-set algorithms at different times, where the different times depend on the pre-set key.

In the case that P(i) is the random number generated from the pre-set key by different pre-set algorithms at different times, the preset algorithm used in the process of data transmission is not the same all the time, but different over time, which further enhances security of the network.

In the case that P'(i) is the random number generated from the pre-set key by different pre-set algorithms at different times, the preset algorithm used in the process of data transmission is not the same all the time, but different over time, which further enhances security of the network.

Second Embodiment

Figure 2:
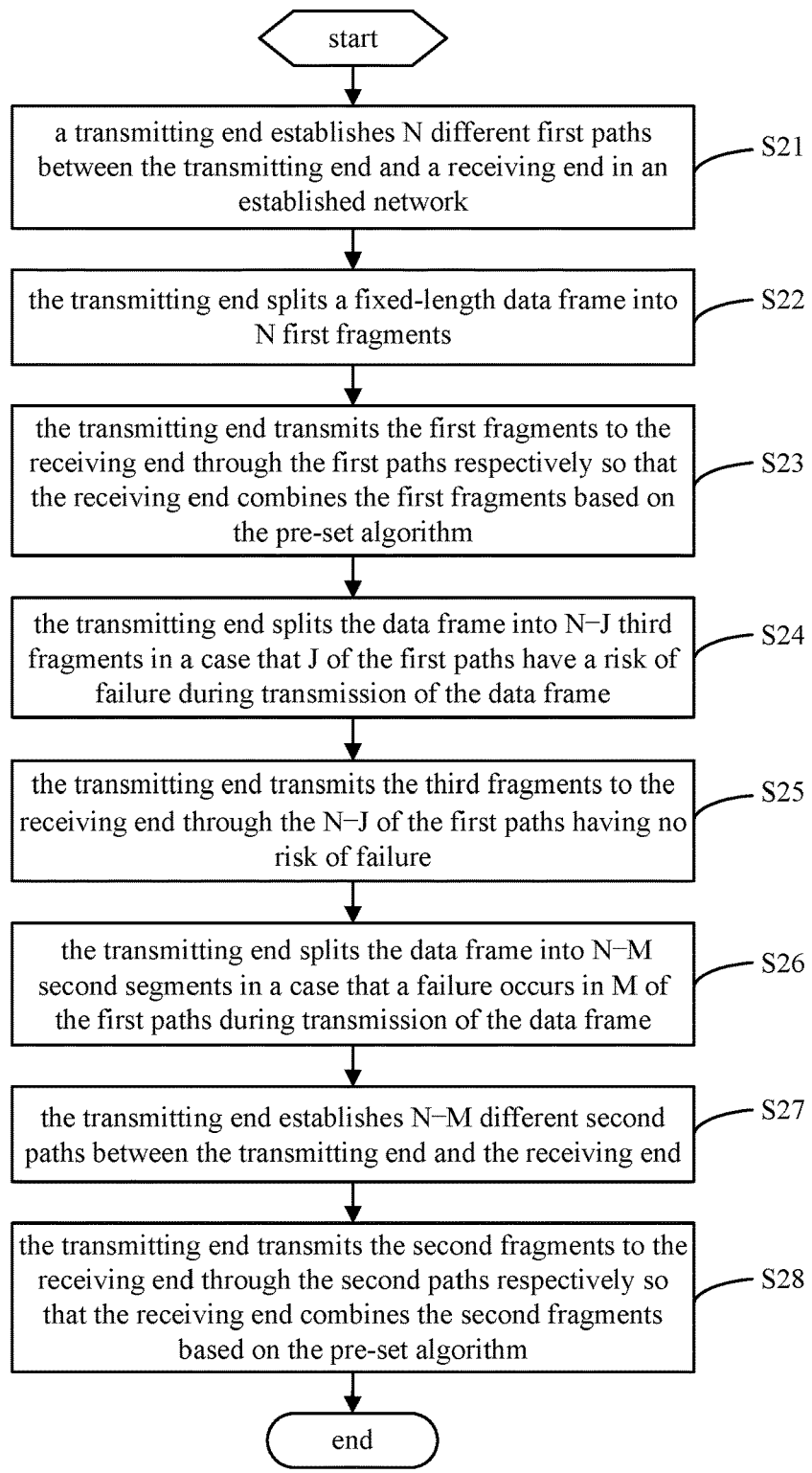
FIG. 2 is a flow chart of a data transmission method according to another embodiment of the present disclosure.

In the embodiment, another data transmission method is provided on the basis of the data transmission method as shown in FIG. 1. Reference is made to FIG. 2. The method may include steps S21 to S28.

In step S21, a transmitting end establishes N different first paths between the transmitting end and a receiving end in an established network.

N is an integer greater than 1.

In step S22, the transmitting end splits a fixed-length data frame into N first fragments. Each of the first fragments corresponds to a different one of the first paths.

In the embodiment, a length of an i-th first fragment is $L*P(i)/\Sigma_{i=1}^{N}P(i)$, where L is the length of the data frame, P(i)

is a random number generated from a pre-set key by a pre-set algorithm, P(i) is greater than 0 and less than 1, and $\Sigma_{i=1}^{N} P(i)=1$.

In step S23, the transmitting end transmits the first fragments to the receiving end through the corresponding first paths respectively so that the receiving end combines the first fragments based on the pre-set algorithm.

In step S24, the transmitting end splits the data frame into N-J third fragments in a case that J of the first paths have a risk of failure during transmission of the data frame.

J is an integer not less than 1 and not greater than N-1, a length of an i-th third segment is $L*P''(i)/\Sigma_{i=1}^{N-J} P''(i)$, P''(i) is a random number generated from the pre-set key by the pre-set algorithm, P''(i) is greater than 0 and less than 1, and $\Sigma_{i=1}^{N-J} P''(i)=1$.

In the embodiment, after transmitting the first fragments to the receiving end through the corresponding first paths respectively, the transmitting end splits the data frame into N-J third fragments in a case that J of the first paths have a risk of failure during transmission of the data frame.

In a case that the J of the first paths have a risk of failure, the remaining first paths are selected to re-transmit data, thereby avoiding a high-risk area, and enhancing security of the network.

In step S25, the transmitting end transmits the third fragments to the receiving end through the corresponding N-J of the first paths having no risk of failure.

In step S26, the transmitting end splits the data frame into N-M second segments in a case that a failure occurs in M of the first paths during transmission of the data frame.

In the embodiment, M is an integer not less than 1 and not greater than N-1, a length of an i-th second segment is $L*P'(i)/\Sigma_{i=1}^{N-M} P'(i)$, P'(i) is a random number generated from the pre-set key by the pre-set algorithm, P'(i) is greater than 0 and less than 1, and $\Sigma_{i=1}^{N-M} P'(i)=1$.

In step S27, the transmitting end establishes N-M different second paths between the transmitting end and the receiving end.

Each of the second fragments corresponds to a different one of the second paths.

In step S28, the transmitting end transmits the second fragments to the receiving end through the corresponding second paths respectively so that the receiving end combines the second fragments based on the pre-set algorithm.

Third Embodiment

Figure 3:
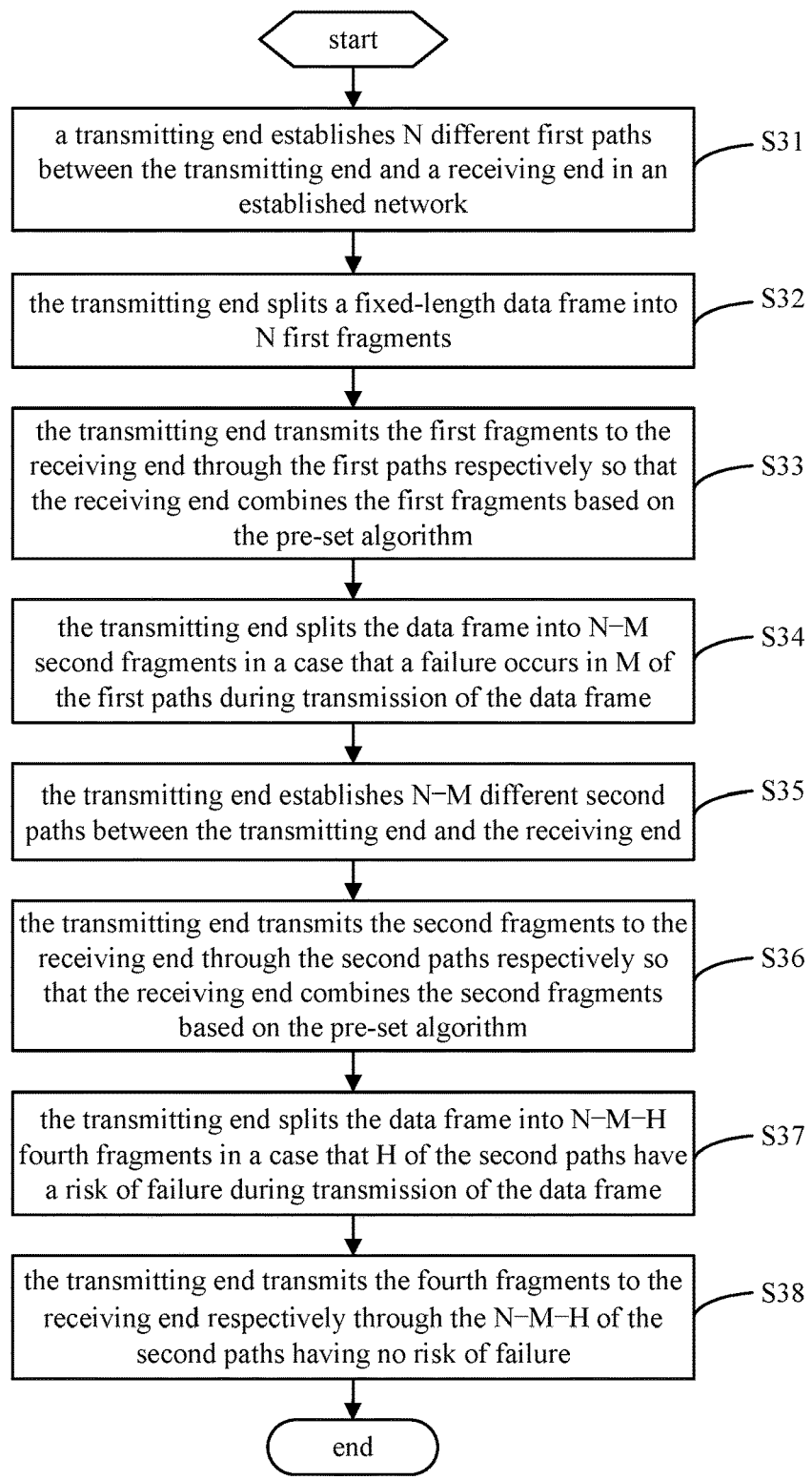
FIG. 3 is a flow chart of a data transmission method according to another embodiment of the present disclosure.

In the embodiment, another data transmission method is provided on the basis of the data transmission method as shown in FIG. 1. Reference is made to FIG. 3. The method may include steps S31 to S38.

In step S31, a transmitting end establishes N different first paths between the transmitting end and a receiving end in an established network.

N is an integer greater than 1.

In step S32, the transmitting end splits a fixed-length data frame into N first fragments. Each of the first fragments corresponds to a different one of the first paths.

In the embodiment, a length of an i-th first fragment is $L*P(i)/\Sigma_{i=1}^{N} P(i)$, where L is the length of the data frame, P(i) is a random number generated from a pre-set key by a pre-set algorithm, P(i) is greater than 0 and less than 1, and $\Sigma_{i=1}^{N} P(i)=1$.

In step S33, the transmitting end transmits the first fragments to the receiving end through the corresponding first paths respectively so that the receiving end combines the first fragments based on the pre-set algorithm.

In step S34, the transmitting end splits the data frame into N-M second fragments in a case that a failure occurs in M of the first paths during transmission of the data frame.

In the embodiment, M is an integer not less than 1 and not greater than N-1, a length of an i-th second segment is $L*P'(i)/\Sigma_{i=1}^{N-M} P'(i)$, P'(i) is a random number generated from the pre-set key by the pre-set algorithm, P'(i) is greater than 0 and less than 1, and $\Sigma_{i=1}^{N-M} P'(i)=1$.

In step S35, the transmitting end establishes N-M different second paths between the transmitting end and the receiving end.

Each of the second fragments corresponds to a different one of the second paths.

In step S36, the transmitting end transmits the second fragments to the receiving end through the corresponding second paths respectively so that the receiving end combines the second fragments based on the pre-set algorithm.

In step S37, the transmitting end splits the data frame into N-M-H fourth fragments in a case that H of the second paths have a risk of failure during transmission of the data frame.

H is an integer not less than 1 and not greater than N-M, a length of an i-th fourth segment is $L*P'''_1(i)/\Sigma_{i=1}^{N-M-H} P'''_1(i)$, $P'''_1(i)$ is a random number generated from the pre-set key by the pre-set algorithm, $P'''_1(i)$ is greater than 0 and less than 1, and $\Sigma_{i=1}^{N-M-H} P'''_1(i)=1$.

In the embodiment, after transmitting the second fragments to the receiving end through the corresponding second paths respectively, the transmitting end splits the data frame into N-M-H fourth fragments in a case that H of the second paths have a risk of failure during transmission of the data frame.

In a case that the H of the second paths have a risk of failure, the remaining second paths are selected to re-transmit data, thereby avoiding a high-risk area, and enhancing security of the network.

In step S38, the transmitting end transmits the fourth fragments to the receiving end respectively through the N-M-H of the second paths having no risk of failure.

Fourth Embodiment

Figure 4:
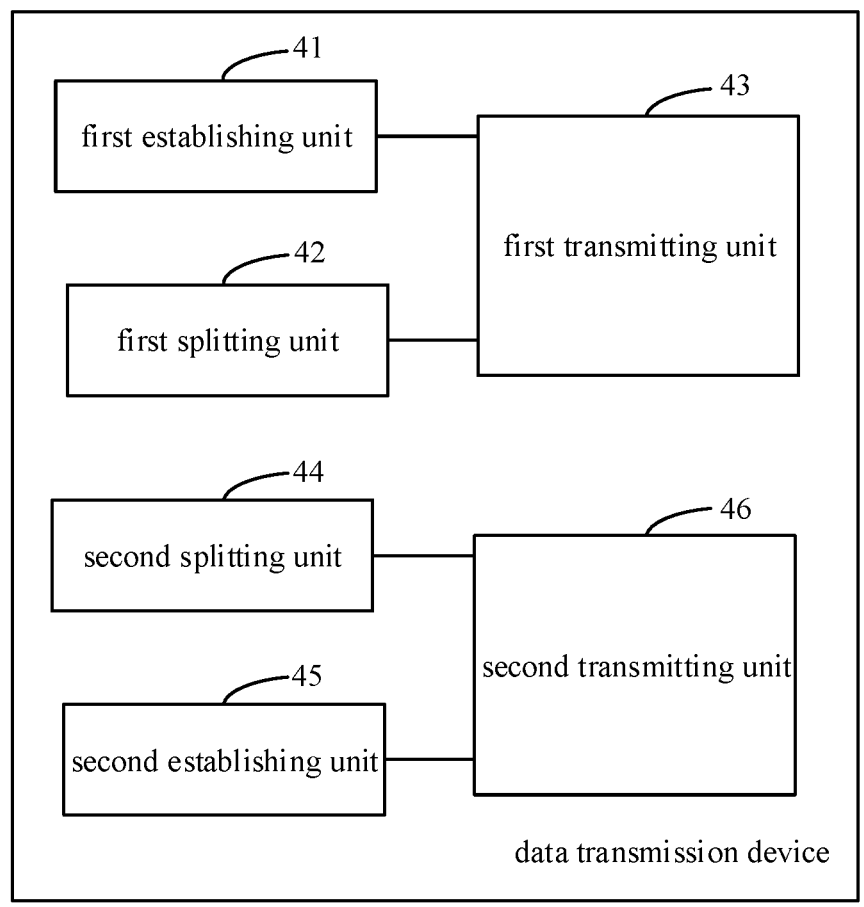
FIG. 4 is a schematic structural diagram of a data transmission device according to an embodiment of the present disclosure.

Corresponding to the data transmission method as shown in FIG. 1, a schematic structural diagram of a data transmission device is provided according to an embodiment of the present disclosure. Referring to FIG. 4, the data transmission device includes a first establishing unit 41, a first splitting unit 42, a first transmitting unit 43, a second splitting unit 44, a second establishing unit 45 and a second transmitting unit 46.

The first establishing unit 41 is configured to establish N different first paths between a transmitting end and a receiving end of in an established network.

N is an integer greater than 1.

The first splitting unit 42 is configured to split a fixed-length data frame into N first fragments. Each of the first fragments corresponds to a different one of the first paths, and a length of an i-th first fragment is $L*P(i)/\Sigma_{i=1}^{N} P(i)$, where L is the length of the data frame, P(i) is a random number generated from a pre-set key by a pre-set algorithm, P(i) is greater than 0 and less than 1, and $\Sigma_{i=1}^{N} P(i)=1$.

The first transmitting unit 43 is configured to transmit the first fragments to the receiving end through the corresponding first paths respectively so that the receiving end combines the first fragments based on the pre-set algorithm;

The second splitting unit 44 is configured to split the data frame into N-M second fragments in a case that a failure occurs in M of the first paths during transmission of the data frame, where M is an integer not less than 1 and not greater than N−1, a length of an i-th second segment is $L*P'(i)/\Sigma_{i=1}^{N-M}P'(i)$, $P'(i)$ is a random number generated from the pre-set key by the pre-set algorithm, $P'(i)$ is greater than 0 and less than 1, and $\Sigma_{i=1}^{N-M}P'(i)=1$.

The second establishing unit 45 is configured to establish N-M different second paths between the transmitting end and the receiving end. Each of the second fragments corresponds to a different one of the second paths.

The second transmitting unit 46 is configured to transmit the second fragments to the receiving end through the corresponding second paths respectively so that the receiving end combines the second fragments based on the pre-set algorithm.

Figure 7:
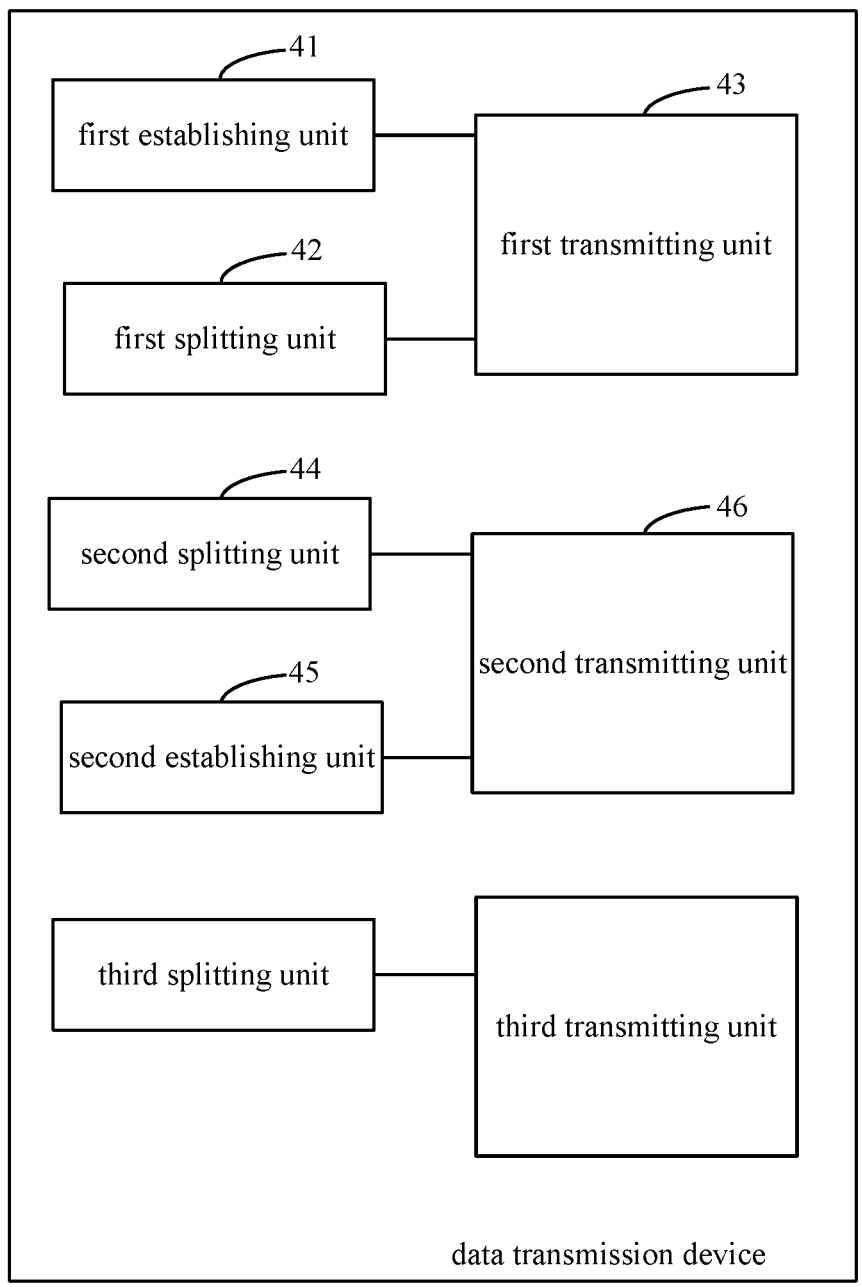
FIG. 7 is a schematic structural diagram of a data transmission device according to an embodiment of the present disclosure.

In the embodiment, the data transmission device as shown in FIG. 4 may further include a third splitting unit and a third transmitting unit, as shown in FIG. 7.

The third splitting unit is configured to, after the first transmitting unit transmits the first fragments to the receiving end through the corresponding first paths respectively, split the data frame into N-J third fragments in a case that J of the first paths have a risk of failure during transmission of the data frame, where J is an integer not less than 1 and not greater than N−1, a length of an i-th third segment is $L*P''(i)/\Sigma_{i=1}^{N-J}P''(i)$, $P''(i)$ is a random number generated from the pre-set key by the pre-set algorithm, $P''(i)$ is greater than 0 and less than 1, and $\Sigma_{i=1}^{N-J}P''(i)=1$.

The third transmitting unit is configured to transmit the third fragments to the receiving end through the corresponding N-J of the first paths having no risk of failure.

Figure 8:
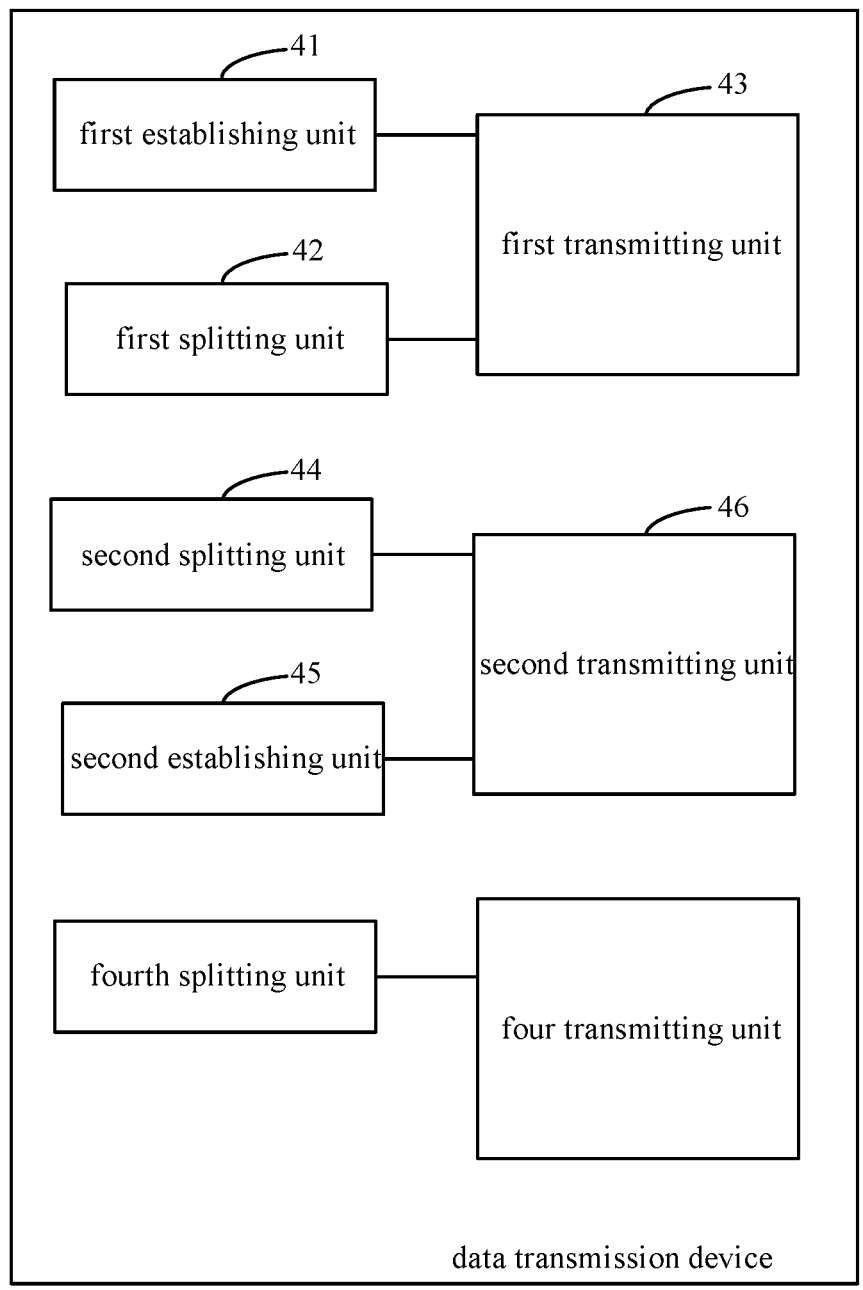
FIG. 8 is a schematic structural diagram of a data transmission device according to an embodiment of the present disclosure.

In the embodiment, the data transmission device as shown in FIG. 4 may further include a fourth splitting unit and a fourth transmitting unit, as shown in FIG. 8.

The fourth splitting unit is configured to, after the second transmitting unit transmits the second fragments to the receiving end through the corresponding second paths respectively, split the data frame into N-M-H fourth fragments in a case that H of the second paths have a risk of failure during transmission of the data frame, where H is an integer not less than 1 and not greater than N-M, a length of an i-th fourth segment is $L*P'''_1(i)/\Sigma_{i=1}^{N-M-H}P'''_1(i)$, $P'''_1(i)$ is a random number generated from the pre-set key by the pre-set algorithm, $P'''_1(i)$ is greater than 0 and less than 1, and $\Sigma_{i=1}^{N-M-H}P'''_1(i)=1$.

The fourth transmitting unit is configured to transmit the fourth fragments to the receiving end respectively through the N-M-H of the second paths having no risk of failure.

It should be noted that various embodiments in the specification are described in a progressive manner, the differences from other embodiments are emphatically illustrated in each embodiment, and reference can be made to other embodiments for understanding the same or similar parts of the embodiments. Since the device disclosed by the embodiments corresponds to the method disclosed by the embodiments, the device is described briefly, and reference is made to the descriptions in the method for related parts.

It should also be noted that, in this context, the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) a . . . " does not exclude the case that other similar elements may exist in the process, method, article or device.

The data transmission method and device according to the present disclosure are described in detail in the above. Particular examples are described to elaborate the principle and the implementations of the present disclosure. The description of the embodiments is merely to facilitate understanding the method and core idea of the present disclosure. In addition, for those skilled in the art, according to the idea of the present disclosure, there may be modifications in particular implementing manner and application range. In summary, the content of the description should not be construed as limit to the present disclosure.

The invention claimed is:

1. A data transmission method, comprising:
   establishing, by a transmitting end, N different first paths between the transmitting end and a receiving end in an established network, wherein N is an integer greater than 1;
   splitting, by the transmitting end, a fixed-length data frame into N first fragments, wherein each of the first fragments corresponds to a different one of the first paths, and a length of an i-th first fragment is $L*P(i)/\Sigma_{i=1}^{N}P(i)$, wherein L is the length of the data frame, $P(i)$ is a random number generated from a pre-set key by a pre-set algorithm, $P(i)$ is greater than 0 and less than 1, and $\Sigma_{i=1}^{N}P(i)=1$;
   transmitting, by the transmitting end, the first fragments to the receiving end through the corresponding first paths respectively, wherein the receiving end combines the first fragments based on the pre-set algorithm;
   splitting, by the transmitting end, the data frame into N-M second fragments in a case that a failure occurs in M of the first paths during transmission of the data frame, wherein M is an integer not less than 1 and not greater than N−1, a length of an i-th second segment is $L*P'(i)/\Sigma_{i=1}^{N-M}P'(i)$, $P'(i)$ is a random number generated from the pre-set key by the pre-set algorithm, $P'(i)$ is greater than 0 and less than 1, and $\Sigma_{i=1}^{N-M}P'(i)=1$;
   establishing, by the transmitting end, N-M different second paths between the transmitting end and the receiving end, wherein each of the second fragments corresponds to a different one of the second paths; and
   transmitting, by the transmitting end, the second fragments to the receiving end through the corresponding second paths respectively, wherein the receiving end combines the second fragments based on the pre-set algorithm.

2. The data transmission method according to claim 1, wherein
   $P(i)$ is the random number generated from the pre-set key by different pre-set algorithms at different times; and/or
   $P'(i)$ is the random number generated from the pre-set key by different pre-set algorithms at different times.

3. The data transmission method according to claim 1, wherein after transmitting, by the transmitting end, the first fragments to the receiving end through the corresponding first paths respectively, the method further comprises:
   splitting, by the transmitting end, the data frame into N-J third fragments in a case that J of the first paths have a risk of failure during transmission of the data frame, wherein J is an integer not less than 1 and not greater than N−1, a length of an i-th third segment is $L*P''(i)/\Sigma_{i=1}^{N-J}P''(i)$, $P''(i)$ is a random number generated from the pre-set key by the pre-set algorithm, P'''(i) is greater than 0 and less than 1, and $\Sigma_{i=1}^{N-J}P'''(i)=1$; and transmitting, by the transmitting end, the third fragments to the receiving end through the corresponding N-J of the first paths having no risk of failure.

4. The data transmission method according to claim 1, wherein after transmitting, by the transmitting end, the second fragments to the receiving end through the corresponding second paths respectively, the method further comprises:

splitting, by the transmitting end, the data frame into N-M-H fourth fragments in a case that H of the second paths have a risk of failure during transmission of the data frame, wherein H is an integer not less than 1 and not greater than N-M, a length of an i-th fourth segment is $L*P'''_1(i)/\Sigma_{i=1}^{N-M-H}P'''_1(i)$, $P'''_1(i)$ is a random number generated from the pre-set key by the pre-set algorithm, $P'''_1(i)$ is greater than 0 and less than 1, and $\Sigma_{i=1}^{N-M-H}P'''_1(i)=1$; and transmitting, by the transmitting end, the fourth fragments to the receiving end respectively through the N-M-H of the second paths having no risk of failure.

5. A data transmission device, comprising:

a first establishing unit configured to establish N different first paths between a transmitting end and a receiving end in an established network, wherein N is an integer greater than 1;

a first splitting unit configured to split a fixed-length data frame into N first fragments, wherein each of the first fragments corresponds to a different one of the first paths, and a length of an i-th first fragment is $L*P(i)/\Sigma_{i=1}^{N}P(i)$, wherein L is the length of the data frame, P(i) is a random number generated from a pre-set key by a pre-set algorithm, P(i) is greater than 0 and less than 1, and $\Sigma_{i=1}^{N}P(i)=1$;

a first transmitter configured to transmit the first fragments to the receiving end through the corresponding first paths respectively, wherein the receiving end combines the first fragments based on the pre-set algorithm;

a second splitting unit configured to split the data frame into N-M second fragments in a case that a failure occurs in M of the first paths during transmission of the data frame, wherein M is an integer not less than 1 and not greater than N-1, a length of an i-th second segment is $L*P'(i)/\Sigma_{i=1}^{N-M}P'(i)$, P'(i) is a random number generated from the pre-set key by the pre-set algorithm, P'(i) is greater than 0 and less than 1, and $\Sigma_{i=1}^{N-M}P'(i)=1$;

a second establishing unit configured to establish N-M different second paths between the transmitting end and the receiving end, wherein each of the second fragments corresponds to a different one of the second paths; and a second transmitter configured to transmit the second fragments to the receiving end through the corresponding second paths respectively, wherein the receiving end combines the second fragments based on the pre-set algorithm.

6. The data transmission device according to claim 5, further comprising:

a third splitting unit configured to, after the first transmitter transmits the first fragments to the receiving end through the corresponding first paths respectively, split the data frame into N-J third fragments in a case that J of the first paths have a risk of failure during transmission of the data frame, wherein J is an integer not less than 1 and not greater than N-1, a length of an i-th third segment is $L*P'''(i)/\Sigma_{i=1}^{N-J}P'''(i)$, P'''(i) is a random number generated from the pre-set key by the pre-set algorithm, P'''(i) is greater than 0 and less than 1, and $\Sigma_{i=1}^{N-J}P'''(i)=1$; and a third transmitter configured to transmit the third fragments to the receiving end through the corresponding N-J of the first paths having no risk of failure.

7. The data transmission device according to claim 5, further comprising:

a fourth splitting unit configured to, after the second transmitter transmits the second fragments to the receiving end through the corresponding second paths respectively, split the data frame into N-M-H fourth fragments in a case that H of the second paths have a risk of failure during transmission of the data frame, wherein H is an integer not less than 1 and not greater than N-M, a length of an i-th fourth segment is $L*P'''_1(i)/\Sigma_{i=1}^{N-M-H}P'''_1(i)$, $P'''_1(i)$ is a random number generated from the pre-set key by the pre-set algorithm, $P'''_1(i)$ is greater than 0 and less than 1, and $\Sigma_{i=1}^{N-M-H}P'''_1(i)=1$; and a fourth transmitter configured to transmit the fourth fragments to the receiving end respectively through the N-M-H of the second paths having no risk of failure.

* * * * *